United States Patent [19]

Brown

[11] Patent Number: 4,575,309

[45] Date of Patent: Mar. 11, 1986

[54] WIND TURBINES

[75] Inventor: Allan W. Brown, Glasgow, Scotland

[73] Assignee: James Howden & Company Ltd., Glasgow, Scotland

[21] Appl. No.: 613,089

[22] Filed: May 22, 1984

[30] Foreign Application Priority Data

May 25, 1983 [GB] United Kingdom ............... 8314405

[51] Int. Cl.[4] ............................................. F03D 7/04
[52] U.S. Cl. ..................................... 416/41; 416/43; 416/89; 416/158; 416/32
[58] Field of Search ............... 416/32, 41 A, DIG. 7, 416/89 A, 137, 89 R, 43 A, 44 A, 50-52 A, 23, 158

[56] References Cited

U.S. PATENT DOCUMENTS

| | | | |
|---|---|---|---|
| 1,757,667 | 5/1930 | Hesse | 416/89 A |
| 2,058,500 | 10/1936 | Plucker | 416/23 X |
| 2,074,149 | 3/1937 | Jacobs | 416/23 X |
| 2,088,255 | 7/1937 | Adams | 416/158 X |
| 2,139,982 | 12/1938 | Smith | 416/158 X |
| 2,152,984 | 4/1939 | Wilford | 416/23 X |
| 2,372,350 | 3/1945 | Abeel | 416/89 |
| 2,415,421 | 2/1947 | De Filippis | 416/89 |
| 2,485,543 | 10/1949 | Andreau | 416/23 X |
| 2,622,686 | 12/1952 | Chevreau et al. | 416/41 A X |
| 3,792,937 | 2/1974 | Chilman | 416/137 X |
| 4,003,676 | 1/1977 | Sweeney et al. | 416/41 A X |
| 4,180,372 | 12/1979 | Lippert | 416/41 A X |
| 4,297,076 | 10/1981 | Donham et al. | 416/24 X |
| 4,355,955 | 10/1982 | Kisovec | 416/23 |
| 4,374,631 | 2/1983 | Barnes | 416/89 A X |
| 4,495,423 | 1/1985 | Rogers | 290/44 |

FOREIGN PATENT DOCUMENTS

| | | | |
|---|---|---|---|
| 63740 | 3/1943 | Denmark | 416/43 A |
| 703319 | 3/1941 | Fed. Rep. of Germany | 416/44 |
| 917540 | 9/1954 | Fed. Rep. of Germany | 416/132 B |
| 922918 | 6/1947 | France | 416/44 A |
| 23374 | 2/1980 | Japan | 416/32 |
| 97081 | 6/1982 | Japan | 416/32 |
| 218459 | 4/1942 | Switzerland | 416/158 |
| 720591 | 12/1954 | United Kingdom | 416/23 |
| 377542 | 7/1973 | U.S.S.R. | 416/23 |

Primary Examiner—Everette A. Powell, Jr.
Attorney, Agent, or Firm—Barnes & Thornburg

[57] ABSTRACT

A wind turbine having the tips of the blades pivotable to a position in which they act as brakes to slow the turbine down. The pivoting is caused by relative axial movement of the tip and main blade portions which is caused by the action of a spring. The spring action is normally overcome by a hydraulic actuator 16. When the hydraulic pressure exceeds a threshold value corresponding to a desired limit rotational speed of the turbine a pressure switch 83 causes a pressure release valve 84 to dump the fluid pressure in the hydraulic actuator 16, thus allowing the spring to operate and cause the pivoting of the tip.

6 Claims, 6 Drawing Figures

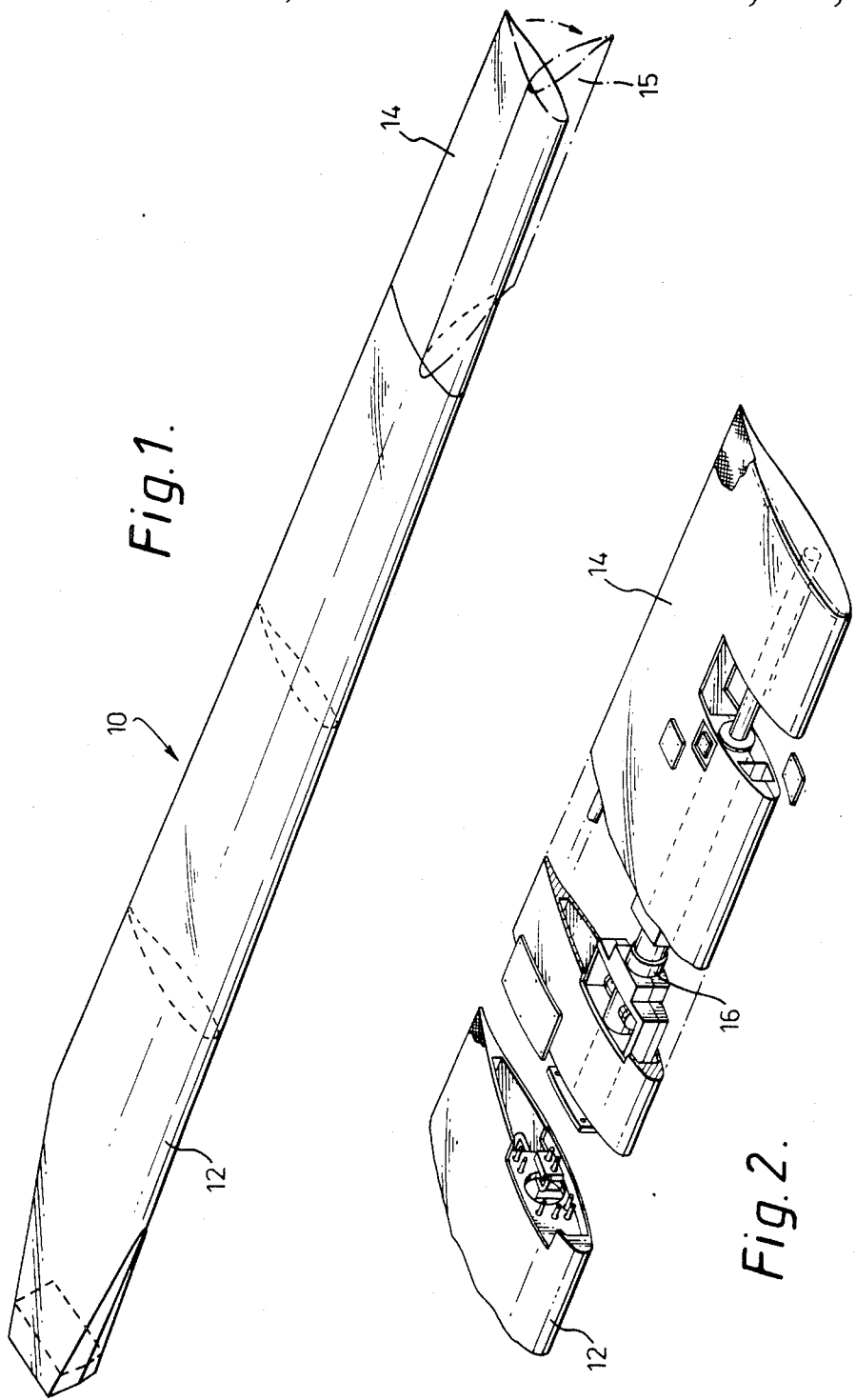

WIND TURBINES

DESCRIPTION

The present invention relates to wind turbines.

Proposals have been made to use wind turbines for generating electricity. They are a particularly efficient way of using what is otherwise waste natural energy. A normally operating wind turbine used in the National Grid is required to run at a speed of approximately 43 rmp to drive a synchronous generator. During normal operation, as the wind speed increases this has little or no effect on the speed of rotation of the wind generator and the generator because of the governor effect of the generator which simply takes more power but maintains the same rotational speed.

However, problems do arise in the run-up period of the turbine. During this run-up period, the turbine is under no load at all, the generator having not been connected. The normal procedure is for the turbine drive shaft to have on it a disc and brakes are caused to operate on this disc at a speed of the order of 50 rpm. However, on occasions the brakes are inadequate or are inoperative and it is an object of the present invention to provide a wind turbine which overcomes this problem.

There is now proposed, according to the present invention, a wind turbine including a plurality of blades, at least two, and preferably all, of the blades having a portion which can have its pitch varied from a normal operating position, pitch variation means to effect variation of the pitch, as the rotational speed of the turbine increases, said means being operable in a manner to alter the pitch in such a way as to cause the speed of the turbine to be reduced, a hydraulic system normally operating to overcome the effect of said pitch variation means, so that the said portions of the blade remain in the normal operating position, the pressure in said system being a function of the rotational speed of the turbine and a valve operable to release pressure in said system when the pressure reaches a threshold value, thereby allowing said variation means to operate to alter the pitch of said portions in said manner when the rotational speed increases sufficiently to cause said pressure to reach said value.

With such a construction, the operation of the pitch variation of the portion of the blades can be effected relatively suddenly. Thus, if the turbine is in its run-up period and a sudden gust of wind occurs which is too great for the operation of the brakes to be effective, when the pressure in the hydraulic system increases above the threshold value, the pressure is suddenly released so that the pitch variation means effect the sudden variation of the pitch thereby aerodynamically braking the wind turbine, which will then normally slow down to a very slow speed, for example of the order of 1 rpm.

In the normal course of events, the said portion of the blades which is capable of pitch variation is the tip portions of those blades which are provided with this pitch variation portion.

Preferably the variation means includes a hydraulic piston and cylinder arrangement in which, when the hydraulic pressure is applied, the tip portion will be urged radially inwardly of the blade towards the main body of the blade, a spring and centrifugal force urging the tip radially outwardly from the main body, at least one helical slot being provided in the tip or main body and a pin or roller being engageable in the or each slot, whereby, when the hydraulic pressure is released, the tip will move radially outwardly and be caused to alter its pitch to an angle which effects the braking of the turbine.

The valve may be controlled, for example, via a computer and an electrical switch sensitive to the pressure of fluid in the hydraulic system, via a direct acting pressure switch sensitive to pressure of fluid in the hydraulic system or may be controlled hydraulically.

In addition to opening the valve the computer can be designed to take the generator off line.

In order that the invention may more readily be understood, the following description is given, merely by way of example, reference being made to the accompanying drawings, in which:

FIG. 1 is a perspective view of a blade of one embodiment of wind turbine according to the present invention;

FIG. 2 is an enlarged fragmentary perspective view of the tip portion of the blade of FIG. 1;

Figure 3:
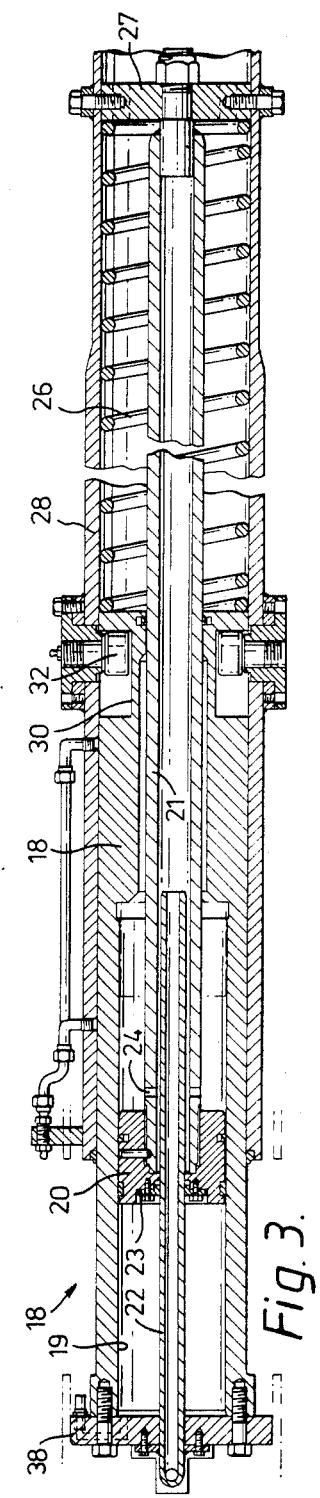
FIG. 3 is a cross-section through the hydraulic actuator of the blade of FIGS. 1 and 2 in the extended position.

Referring first to FIGS. 1 and 2, the blade 10 includes a main blade portion 12 of normal aerofoil cross-section and a tip portion 14 which is pivotable to the braking position indicated in phantom at 15. In order to effect this tilting or pivoting motion of the portion 14, a hydraulic actuator 16 (FIG. 2) is provided between the tip portion and the main blade 12. This actuator is shown in more detail in FIGS. 3, 4 and 5 and includes a cylinder 18 having a bore 19 in which is axially slidable a piston 20 connected to a piston rod 21. The piston moves relative to a fixed rod 22 in the form of a tube which is sealed to the piston by a gasket 23. The left hand end, as viewed in FIGS. 3 and 4, of the tubular rod 22 is connected to a source of fluid under pressure to be described later, and the righthand end opens into the interior of the piston rod whereby fluid under pressure can be admitted, via ports 24 into the interior of the cylinder to the right of the piston 20. The piston rod 21 is urged to the right mainly by centrifugal force and partly by means of a coil compression spring 26 engaged between the righthand end of the cylinder and a plate 27 engaged on the end of the piston rod and carried by a sleeve 28 surrounding the cylinder 18. The cylinder 18 is provided with a helical groove 30 in its outer surface in which is engaged a roller 32 mounted on the sleeve 28.

Figure 4:
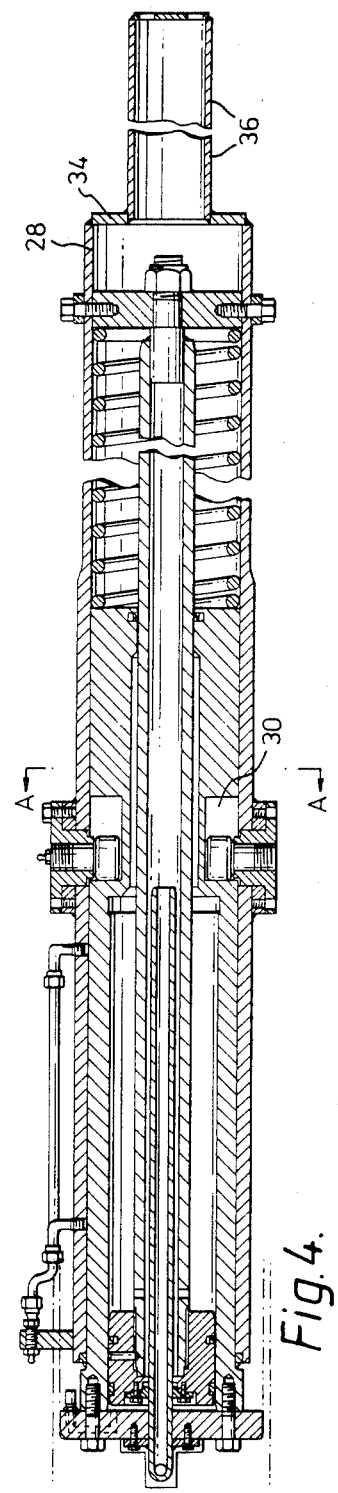
FIG. 4 is a view similar to FIG. 3 in the normal, retracted position and taken along the line B—B of FIG. 5.
Figure 5:
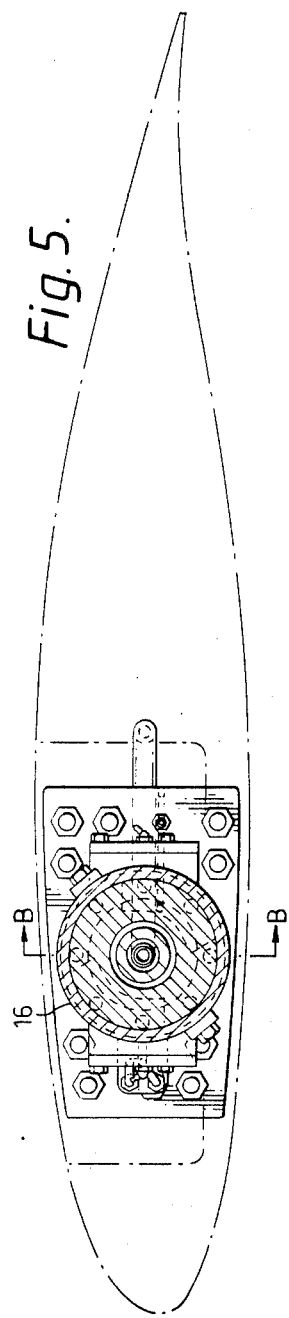
FIG. 5 is a section taken along the line A—A of FIG. 4.

Thus, axial movement of the piston in the cylinder will cause rotation of the sleeve 28 due to the interaction between the rollers 32 and the helical grooves 30. As seen in FIG. 4, the sleeve 28 is connected via a plate 34 to a stub shaft 36 which is secured to the blade tip 14 (not shown in FIG. 4) whilst the other end of the actuator is connected by an end plate 28 to the main blade portion 12. In the relaxed position of the spring, shown in FIG. 3, the blade tip 14 will be twisted or rotated to the position shown at 15 in FIG. 1. When hydraulic pressure is applied the piston will move to the left so that the rotation of the sleeve will cause the aerofoil section of the blade tip to be aligned with that of the main blade portion 12.

Figure 6:
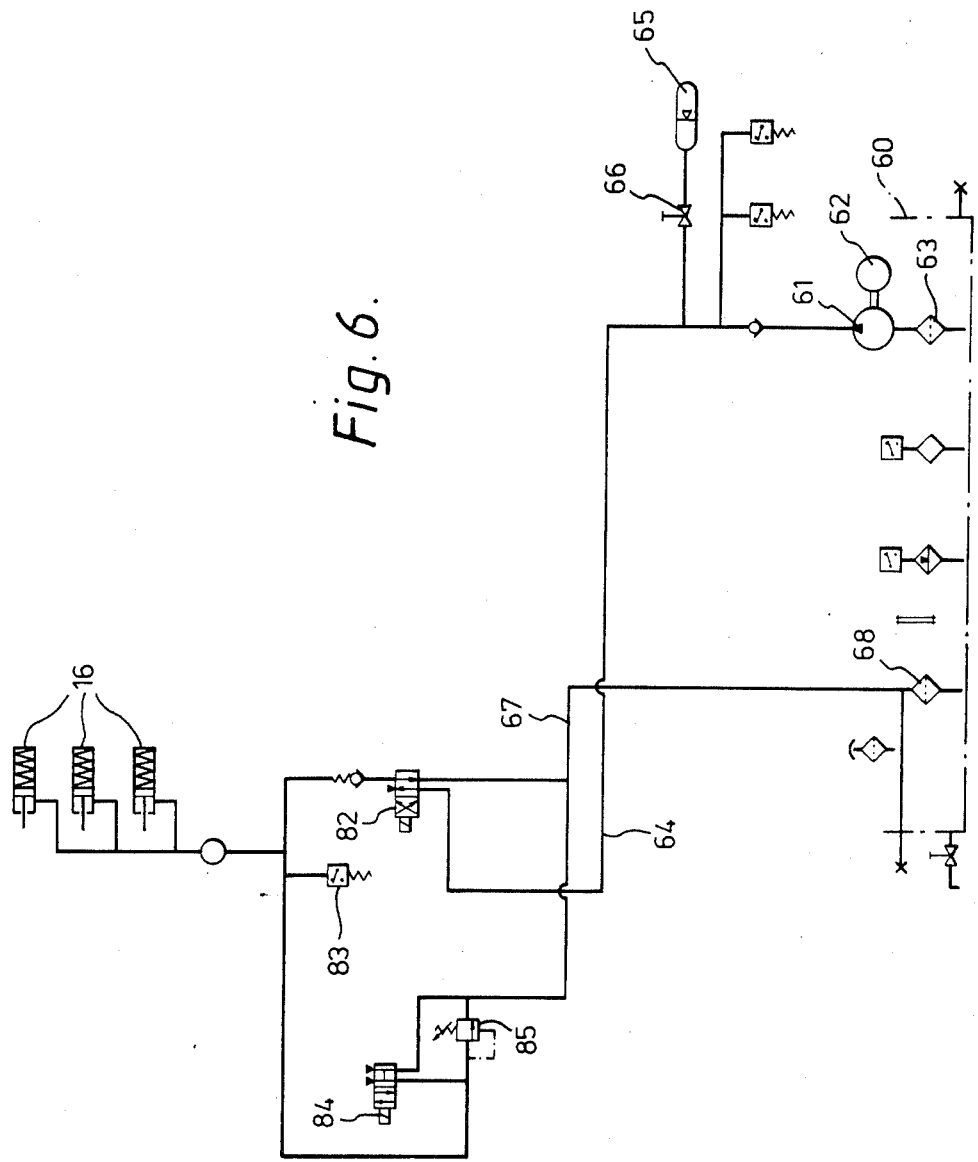
FIG. 6 is a schematic hydraulic circuit diagram for the operation of the actuator of FIGS. 3, 4 and 5 and other items of the wind turbine.

Referring now to FIG. 6, there is illustrated therein a hydraulic circuit for effecting the operation of the various components of the wind turbine of the present invention. There are several functions which are not directly concerned with the present invention and will not be described in great detail. Suffice it to say that the hydraulic circuit includes a sump 60 which is open to atmosphere and is filled with hydraulic fluid. A pump 61 driven via a motor 62 draws hydraulic fluid via a filter 63 and pressurizes a line 64 which serves to provide a pressure for the whole of the system. A side arm of the pressure side of the pump is connected to an accummulator 65 via a valve 66.

A low pressure line 67 is connected via a filter 68 to to return fluid to the reservoir 60.

The diagram illustrates the three actuators 16 for the pitch variation of the present invention, these being connected across the high and low pressure lines a control valve 82, the pressure in the actuators is sensed via a pressure switch 83 and this is operatively connected to a pressure relief valve 84 and finally a safety valve 85 is provided in the line.

Thus, in the normal course of events, the pressure produced by the pump 61 introduces fluid under pressure into the actuator 16 to maintain the tips of the blades in alignment with the main blade portions. When the pressure rises above a given threshold value due to the increased centrifugal force, for example, that equivalent to about 50 revolutions per minute, an emergency brake is actuated to prevent the speed of the rotor of the turbine exceeding this value. However, in certain circumstances, if the wind pressure suddenly increased during the run-up period of the wind turbine, the emergency brake will not be sufficient to effect the slowing down, or, alternatively, should the emergency brake fail, then the pressure switch 83 will sense a pressure value corresponding to a rotational speed of, say, 52 rpm. The effect of this is to cause the valve 84 to open, thereby dumping the fluid pressure in the hydraulic cylinders via the low pressure line 67 to the reservoir 60. The spring 26 and centrifugal force will then urge the end plate 27 and thus the sleeve 28 to the right, i.e. to the position shown in FIG. 3, this in turn causing the rollers 32 to move in helical slots 30 thereby changing the pitch of the tip portions of the blades. This will bring about a rapid reduction in the rotational speed of the rotor so that it diminishes to practically nothing, i.e. to about 1 to 2 rpm. By dumping the pressure in the actuators completely, the tips move rapidly to their fully tilted condition and this ensures rapid slowing down of the rotor. This is important to prevent damage to the equipment when the emergency brakes do not operate properly.

Pressure relief valve 85 is provided to release the pressure, relatively slowly, should the valve 84 fail to operate for some reason. If valve 85 does release the pressure, the blade tips will change their angle slightly, but to such an extent as would happen if the valve 84 were to operate properly.

I claim:

1. A wind turbine comprising:
    (a) a plurality of blades,
    (b) variable pitch portions on at least two of said blades,
    (c) said variable pitch portions being movable between normal operating positions and altered pitch positions and being effective when in said altered pitch positions to cause the speed of the turbine to be reduced,
    (d) pitch variation means tending to effect movement of said variable pitch portions towards said altered pitch positions,
    (e) a hydraulic system normally operating to overcome the effect of said pitch variation means, so that the said portions of the blade remain in the normal operating position,
    (f) pressure generating means for pressurising said hydraulic system as a function of the rotational speed of the turbine, and
    (g) a valve operable to release pressure in said hydraulic system when said pressure reaches a threshold value corresponding to a maximum turbine speed,
  whereby, when the rotational speed of said turbine increases sufficiently to cause said pressure to reach said value, said hydraulic system ceases to operate and said variation means is free to effect said movement of said variable pitch portions towards said altered pitch positions to reduce the rotational speed.

2. A wind turbine according to claim 1, wherein said variable pitch portions of the blades comprise tip portions of said at least two blades, said at least two blades additionally comprising main bodies.

3. A wind turbine according to claim 2, wherein said pitch variation means and hydraulic system comprise:
    (a) a hydraulic piston and cylinder arrangement adapted to urge said tip portion radially inwardly of said blade towards said main body of the blade when hydraulic pressure is applied,
    (b) a spring urging the tip portion radially outwardly from said main body,
    (c) at least one helical slot, said slot being provided in one of the tip portion and main body and
    (d) a pin or roller mounted on the other of the tip portion and main body and engaged in and slidable along the or each slot,
  whereby, when hydraulic pressure is applied, the tip portion is held radially inwardly relative to the main body, and, when the hydraulic pressure is released, the tip portion moves radially outwardly under the effect of said spring and is caused to alter its pitch to the altered pitch position, in which it effects braking of the turbine, under the effect of said pin or roller sliding in said helical slot.

4. A wind turbine according to claim 1, and further comprising a computer and an electrical switch sensitive to pressure of fluid in said hydraulic system, via which said valve is controlled.

5. A wind turbine according to claim 1, and further comprising a direct acting pressure switch sensitive to pressure of fluid in said hydraulic system, to control said valve.

6. A wind turbine according to claim 1, and further comprising hydraulic means via which said valve is controlled.

* * * * *